Patented Sept. 24, 1935

2,015,533

UNITED STATES PATENT OFFICE 2,015,533

COMPOSITION FOR MOTHPROOFING

Richard M. Ritter, Elkins Park, Pa.

No Drawing. Application March 16, 1932,
Serial No. 599,349

8 Claims. (Cl. 167—37)

My invention relates to the mothproofing of animal fibres and particularly to compositions of matter for rendering such fibres mothproof.

The object of my invention is to provide a substance which is at once cheap and extremely efficient for mothproofing of animal fibres. A suitable substance should be capable of easy application to the fibres, susceptible to assimilation by the fibres and durable with regard to the length of time for which it retains its effectiveness against the ravages of moths.

I have found that when brucine is condensed with aniline a compound is formed which may be termed brucine anilide and which possesses an effectiveness in mothproofing markedly superior to brucine itself and its salts. Not only has this compound superior mothproofing qualities but it possesses the very desirable property of rendering fibres immune to the growth and attack of mildew. The simultaneous presence of these two properties in a single substance considerably enhances the value of that substance since it makes it possible to accomplish by the use of that substance what hitherto required the use of two or more substances. Brucine anilide is obtained by fusing equimolecular quantities of brucine and aniline. It is a solid and is insoluble in water but soluble in dry solvents such as alcohols, ethers, benzene, chloroform, carbon disulphide, carbon tetrachloride and hydrocarbons of the nature of benzine. Like brucine itself, brucine anilide can be used in conjunction with mordants, penetrating agents and insect repelling agents of the nature of phenyl salicylate.

Brucine anilide is made soluble in water by treating it with certain inorganic acids and certain aliphatic acids of low molecular weight. The most suitable acids for this purpose are concentrated hydrochloric acid, glacial acetic acid, concentrated formic acid and concentrated lactic acid. These acid salts are formed by heating brucine anilide for about two hours at 100° C. with equimolecular proportions of the selected acid. These compounds can be permanently fixed on the fibre by using them in conjunction with the conventional metal mordants.

Higher aliphatic acids, such as, oleic acid, stearic acid, linoleic acid, linolenic acid, palmitic acid and ricinoleic acid, the two first named being the most effective, combine with brucine anilide to form compounds which dissolve in dry solvents to give solutions which have greater penetrating power than those obtained by dissolving brucine anilide itself in dry solvents. These compounds, particularly the oleate and stearate, dissolve much more quickly and much better in dry solvents than does brucine anilide itself. The dry solvents contemplated are alcohols, ethers, chloroform, carbon bisulphide, carbon tetrachloride, benzene and hydrocarbons of the nature of benzine. These compounds are formed by heating equimolecular parts of brucine anilide and the selected acid for about an hour at a temperature of about 100° C.

Brucine anilide and all its aforementioned salts are usually applied to the fibres, to be treated, in the form of their solutions either by spraying or dipping. The application can take place either after the fibre has undergone all preliminary treatments such as degreasing, fulling, carbonizing and dyeing or at some intermediate stage in the working up of the fibres. For example, when water soluble salts of brucine anilide are employed in conjunction with a mordant the application of said salts can be concurrent with the dyeing of the fibres.

The practical embodiment of my invention is illustrated by the following examples which are not intended to limit the scope of my invention. In said examples all parts are by weight.

Example 1

Animal fibres are treated for from ten to twenty minutes in a 1½% naphtha solution of a mixture or three parts of brucine anilide and five parts of phenyl salicylate. After this treatment the fibrous material can be stored for an unlimited period in a damp place without being attacked by mildew or the larvæ of moths.

Example 2

Seven parts of brucine anilide are heated with fifteen parts of oleic acid for one hour at 200° F. A 1½% solution of the resulting brucine anilide oleate in naphtha forms a bath in which animal fibres can be rendered mothproof and mildew proof by immersion for about twenty minutes.

Example 3

Seven parts of brucine anilide are heated with seventeen parts of stearic acid for one hour at 200° F. A 2% solution of the resulting brucine anilide stearate in carbon tetrachloride forms a bath in which animal fibres can be rendered mothproof and mildew proof by immersion for about fifteen minutes.

Example 4

A good mothproof and mildew proof effect is imparted to animal fibres by immersing them for about twenty minutes at a slightly elevated temperature, usually not above that of tepid water, in a 2% water solution of any one of the products resulting from the following reactions:

A. The product resulting from heating seven parts of brucine anilide with two parts of glacial acetic acid for two hours at 212° F.

B. The product resulting from the same treatment of seven parts of brucine anilide and 1½ parts of concentrated hydrochloric acid.

C. The product resulting from the same treatment of seven parts of brucine anilide and two parts of concentrated formic acid.

D. The product resulting from the same treatment of seven parts of brucine anilide and three parts of concentrated lactic acid.

*Example 5*

Animal fibres are rendered permanently immune to moths and mildew by treating them at 140° F. for about twenty minutes in a 1½ solution of any of the following mixtures:

A. Three parts brucine anilide acetate
   Six parts anhydrous solid sulphate
   Two parts tartar emetic acid
   One-half part saponin.

B. Three parts brucine anilide hydrochloride
   Seven parts anhydrous sodium sulphate
   One part aluminum sulphate
   One-half part saponin.

C. Three parts brucine anilide formate
   Six parts anhydrous sodium sulphate
   One and one-half parts zinc sulphate
   One-half part saponin.

Having thus described the nature and objects of my invention and illustrated practical embodiments of the same, what I claim as new and useful and desire to secure by Letters Patent is:

1. A mothproofing composition comprising a dry solvent and brucine aniline.

2. A mothproofing composition comprising water and a compound of brucine anilide with a concentrated acid selected from the group consisting of hydrochloric acid, acetic acid, organic acid and lactic acid.

3. A mothproofing composition comprising a dry solvent and a compound of brucine anilide with a concentrated acid selected from the group consisting of oleic acid, stearic acid, linoleic acid, linolenic acid, palmitic acid and ricinoleic acid.

4. A mothproofing composition comprising water and a hydrochloride of brucine anilide.

5. A mothproofing composition comprising a dry solvent and the oleate of brucine anilide.

6. A mothproofing composition comprising a dry solvent and the stearate of brucine anilide.

7. A mothproofing composition comprising naphtha and the oleate of brucine anilide.

8. A mothproofing composition comprising a substance selected from the group consisting of brucine anilide and its salts.

RICHARD M. RITTER.